(12) United States Patent
Bazinski

(10) Patent No.: US 8,522,641 B2
(45) Date of Patent: Sep. 3, 2013

(54) ADJUSTABLE PALM SWELLS FOR A STEERING WHEEL

(75) Inventor: Stephen N. Bazinski, Amherstburg (CA)

(73) Assignee: Ford Global Technologies, LLC, Dearborn, MI (US)

(*) Notice: Subject to any disclaimer, the term of this patent is extended or adjusted under 35 U.S.C. 154(b) by 662 days.

(21) Appl. No.: 12/437,125

(22) Filed: May 7, 2009

(65) Prior Publication Data
US 2010/0282018 A1   Nov. 11, 2010

(51) Int. Cl.
*B62D 1/04* (2006.01)

(52) U.S. Cl.
USPC .......................................................... 74/552

(58) Field of Classification Search
USPC .................. 74/552, 558; 137/223, 624.27
See application file for complete search history.

(56) References Cited

U.S. PATENT DOCUMENTS

| | | | | |
|---|---|---|---|---|
| 4,640,150 A * | 2/1987 | Kobayashi et al. | | 74/552 |
| 5,257,470 A | 11/1993 | Auger et al. | | |
| 5,294,117 A * | 3/1994 | Huang | | 473/523 |
| 5,355,552 A | 10/1994 | Huang | | |
| 6,382,661 B1 * | 5/2002 | Sutherland | | 280/728.2 |
| 6,540,627 B1 * | 4/2003 | Leal et al. | | 473/564 |
| 6,821,218 B2 * | 11/2004 | Byrne et al. | | 473/568 |
| 6,832,413 B1 | 12/2004 | Applewhite et al. | | |
| 7,004,655 B2 | 2/2006 | Ferrara | | |
| 2005/0268744 A1 * | 12/2005 | Embach et al. | | 74/551.9 |

FOREIGN PATENT DOCUMENTS

| | | |
|---|---|---|
| DE | 19746318 A1 | 3/2000 |
| DE | 19919278 A1 | 11/2000 |
| DE | 10026627 A1 | 12/2001 |
| EP | 1764283 A1 | 3/2007 |
| JP | 58183349 A | 10/1983 |
| JP | 1178078 A | 7/1989 |

* cited by examiner

*Primary Examiner* — Vicky Johnson
(74) *Attorney, Agent, or Firm* — Vichit Chea; Brooks Kushman P.C.

(57) ABSTRACT

A steering wheel having a manually adjustable palm swell is disclosed. To accommodate vehicle operators of a wide range of grip sizes, an adjustable palm swell is desired. A steering wheel having a generally hoop shaped core material is covered in thermoplastic resin and then with an outer cover. A bladder assembly is provided within the outer cover. The bladder assembly includes a bladder, a bulb connected to the bladder, the bulb having check valves on its inlet and outlet. The bulb, if depressed successively, causes air to flow into the bladder, thereby increasing the diameter of the steering wheel in the vicinity of the bladder. The bladder assembly further has a relief check valve connected to the bladder, which is manually actuated to allow air to be released from the bladder and decrease the diameter of the steering wheel in the vicinity of the bladder.

16 Claims, 6 Drawing Sheets

ADJUSTABLE PALM SWELLS FOR A STEERING WHEEL

BACKGROUND

1. Technical Field

The development relates to an adjustable palm swell located within a steering wheel that can be adjusted to provide a comfortable grip to the operator.

2. Background Art

It is more comfortable for the operator of a vehicle to grip a steering wheel for any period of time when the cross-sectional diameter of the steering wheel is sized appropriately to the hand of the operator. It is known in the prior art to provide a larger diameter in the area where the steering wheel is commonly gripped rather than providing a steering wheel with the greater cross-sectional diameter over the entire circumference of the wheel. However, the size of this larger diameter section, commonly called a palm swell, if fixed in diameter, doesn't provide the desired comfort for vehicle operators that have significantly larger or smaller grips than the design grip size.

SUMMARY

The inventor of the present invention has recognized that by providing palm swells, which can be adjusted in size, a greater variability grip size can be accommodated by a single design.

A steering wheel is disclosed which has a core material with a thermoplastic resin around the core material, a flexible outer cover over the foam, and a bladder assembly inside the outer cover. The thermoplastic resin can be made from polyurethane, polyvinyl chloride (PVC), polycarbonate, carbon fiber, or any other material known to one skilled in the art. The bladder assembly has a bladder, a bulb coupled to the bladder, and a relief check valve coupled to the bladder. The length of the bladder is roughly a contact length of a human hand along a circumference of the steering wheel when the human hand is grasping the steering wheel, which may be in the range of 4 to 15 centimeters in length. The system further contains a first check valve disposed between the bulb and the bladder and a second check valve disposed on an inlet side of the bulb. In one embodiment, the first and second check valves are duckbill valves. In one embodiment, the bulb and the relief valve are manually actuated, adapted to be actuated by a human digit. In yet another embodiment, the thermoplastic resin applied to the core material is thicker in the vicinity of the bladder, thereby making the cross-sectional diameter of the steering wheel larger in the vicinity of the bladder. In another embodiment, at least two bladder assemblies are disposed within the outer cover. In a typical automotive application, the core material is generally hoop shaped. However, any known shape for a steering wheel, such as a bowtie or W-shaped, is envisioned.

An assembly for providing a user-adjustable gripping surface for a user actuator is disclosed which has a bladder disposed beneath an expandable outer covering of the gripping surface of the vehicle, an inlet tube coupled to the bladder, a bulb disposed in the inlet tube, a first check valve disposed in the inlet tube between the bulb and the bladder, a second check valve disposed in the inlet tube on the upstream side of the bulb, an outlet tube from the bladder to atmosphere, and a normally-closed relief valve disposed in the outlet tube. In one non-limiting embodiment, the user actuator is a steering wheel. The steering wheel can be used in an automotive vehicle, a boat, a plane, an off-road vehicle, as examples. The first check valve is normally closed, but opens when pressure within the bulb exceeds pressure within the bladder. The second check valve is normally closed, but opens when atmospheric pressure exceeds the pressure within the bladder and atmospheric air is supplied to the bladder by manually depressing and releasing the bulb. These actions cause the first and second valves to open, respectively. The assembly is mounted at a grip position of the actuator. The relief valve is located at a position accessible by a digit of a hand gripping the user actuator. The user actuator, in one embodiment, is a steering wheel.

A method for adjusting a gripping surface in a vehicle is disclosed. By selectively filling and emptying a bladder disposed beneath an outer layer of the gripping surface, the circumference of the gripping surface is selectively increased and decreased, respectively. In one embodiment, selectively filling is accomplished by manually pumping an inflator bulb coupled to the bladder, with the inflator bulb disposed beneath the outer layer of the gripping surface. In one embodiment, the gripping surface is that of a steering wheel of the vehicle.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a steering wheel for an automotive vehicle. However, the inflatable bladder may be incorporated into various other types of vehicles and various other types of operator and/or passenger controls, handles, etc. to provide an adjustable grasping or gripping contour. Those of ordinary skill in the art may recognize similar applications or implementations whether or not explicitly described or illustrated.

Figure 1:
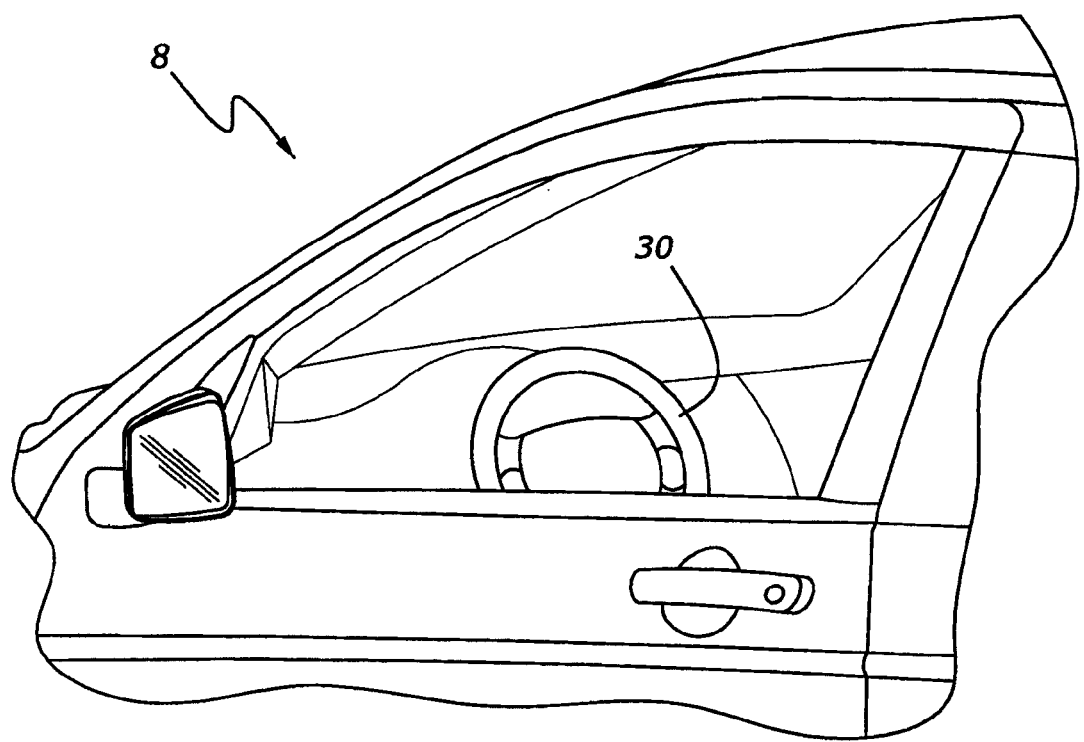
FIG. 1 is a view of a steering wheel in an automotive vehicle.

In FIG. 1, a portion of an automotive vehicle 8 is shown in which a steering wheel 30 is included. Such a steering wheel 30 is one, non-limiting example application of the present invention.

Figure 2:
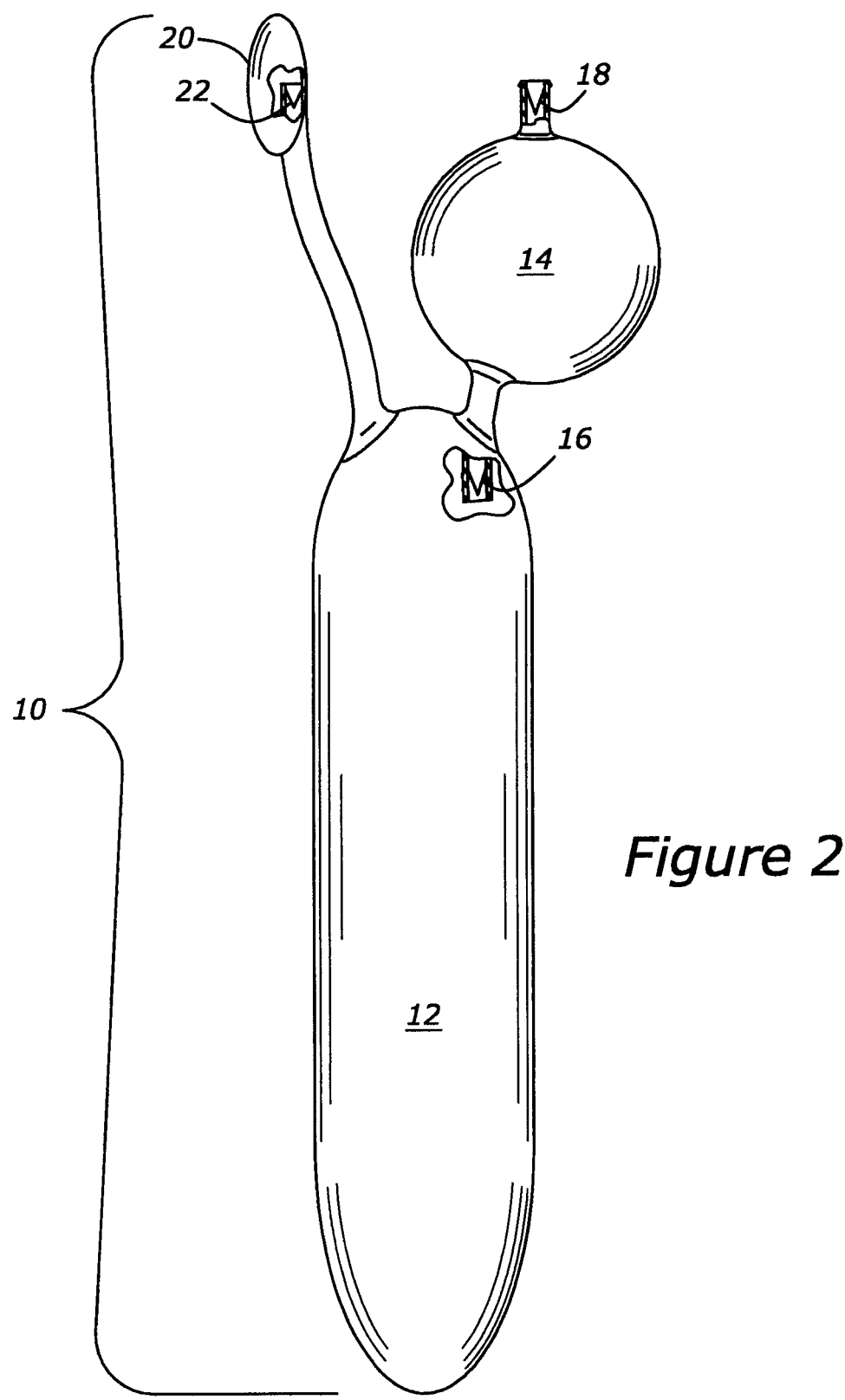
FIG. 2 is a view of the bladder system prior to being installed in a steering wheel.

A bladder assembly 10 is shown in FIG. 2, having a bladder 12 which is filled by bulb 14. Duckbill valves 16 and 18 are provided downstream and upstream, respectively, of bulb 14. Duckbill valves are one-way valves. When bulb 14 is depressed, valve 16 opens, i.e., the two portions of the valve are forced apart allowing air to flow from bulb 14 into bladder 12. Concurrently, the pressure acting on duckbill valve 18 presses the two portions of valve 18 closed further. Bulb 14 is made of a resilient material such that when no longer depressed, bulb 14 regains it original shape, thereby establishing a slight vacuum in bulb 14. The vacuum acts upon valve 18 to cause the two portions of the valve to separate allowing external air to enter through valve 18. Concurrently, the vacuum acting on valve 16 causes the two portions of valve 16 to draw together and remain closed. In this manner, bladder 12 can be pumped up by multiple depressions applied to bulb 14.

Valve 22 is an outlet valve to bladder 12. When there is a positive pressure in bladder 12, i.e., when air is forced into bladder 12, the pressure acting on valve 22 causes it to remain closed. However, button 20, coupled to relief valve 22, acts to press apart the two halves of duckbill valve 22 causing it to open under manual control.

Valve 22 and bulb 14 are shaped as an ovoid and a sphere, respectively, in FIG. 2. Alternative shapes for valve 22 and bulb 14 are contemplated and within the scope of the present invention.

Figure 3A:
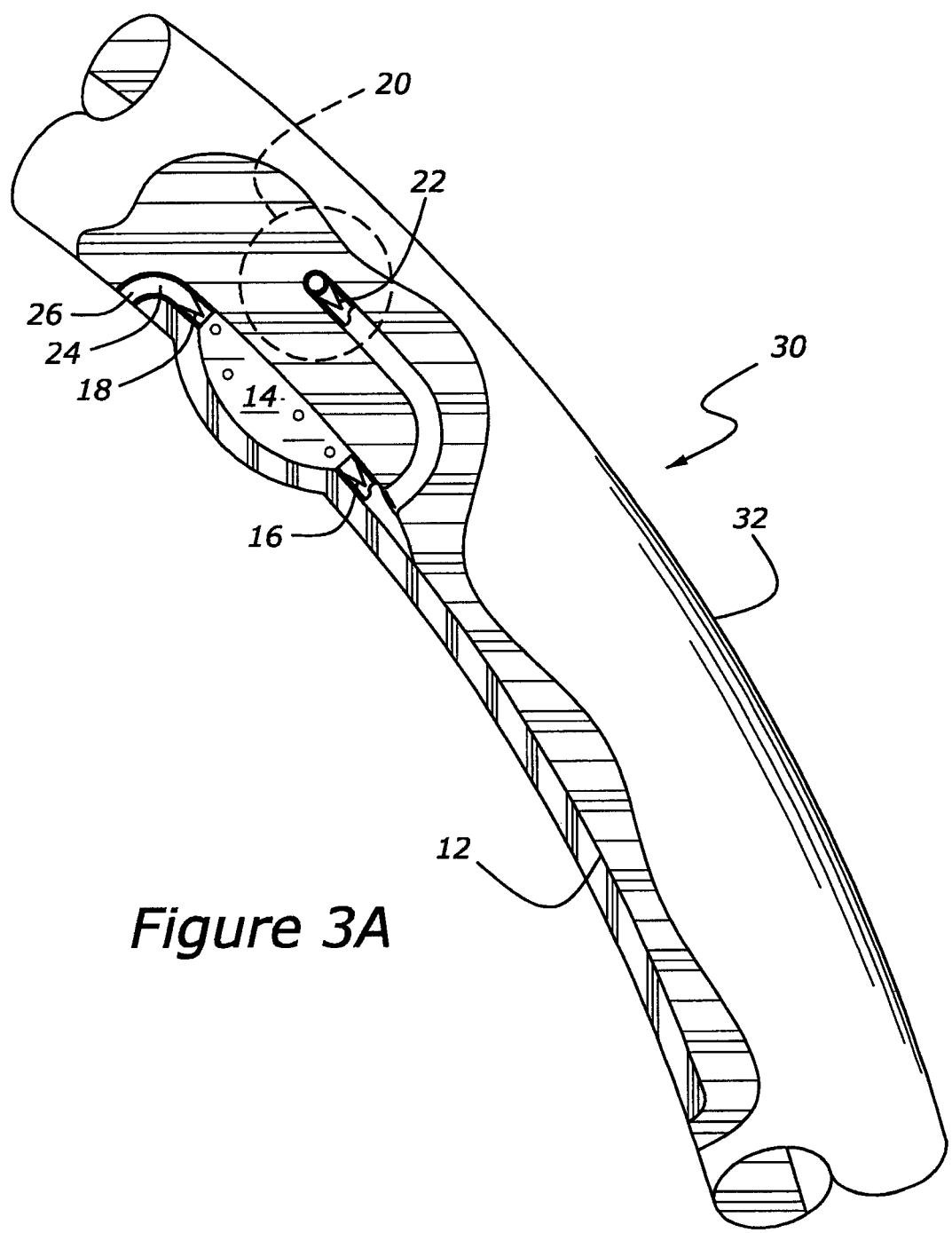
FIG. 3A is a view of the bladder system as installed in a steering wheel as seen from the driver's point of view when facing the steering wheel when the bladder is deflated.

Referring to FIG. 3A, bladder assembly 10 is shown installed within a steering wheel. In particular, the right hand upper side of the steering wheel rim is shown. Another such bladder assembly 10 can be installed in the left hand upper side of the rim of steering wheel 30. Steering wheel 30 is made up of a solid steel ring (shown in cross-section in FIG. 6 as element 34) with several spokes (not shown) to affix the steering wheel rim to the steering wheel hub (not shown). The ring is covered with a thermoplastic resin or other type of material (shown in cross-section in FIG. 6 as element 36). The thermoplastic resin can be made less dense, and thus lighter weight, by adding a foaming agent into the resin. The resulting material is a non-resilient foam. The term thermoplastic resin, herein, refers to both a thermoplastic resin without an added foaming agent and a thermoplastic resin to which a foaming agent has been added. The thermoplastic resin 36 has a cover 32 on the outside of the steering wheel, which the operator of the vehicle grips. Cover 32 is made of an elastic material to accommodate the expansion of bladder 12. In one alternative, natural leather is employed. However, in some applications, the extra flexibility of a synthetic material, such as synthetic leather, is employed.

In the embodiment shown in FIG. 3A, when bladder 12 is fully deflated, the circumference of the rim in the vicinity of bladder 12 is nearly the same as in rim sections without a bladder. Alternatively, in the vicinity of bladder 12, additional thermoplastic resin material is provided so that, even with a fully deflated bladder 12, a bit of a residual palm swell may exist. In yet a further embodiment, a larger amount of thermoplastic resin is provided in the vicinity of bladder 12 so that even when bladder 12 is fully deflated, there is a modest palm swell. Bulb 14 is mounted in a location which is accessible to an operator's thumb as steering wheel 30 is grasped. Air can be caused to enter through duckbill valves 18 and 16 by depressing bulb 14. Depending on the porosity in the vicinity of the opening to valve 18, it may be found advantageous to provide an aperture 26 to atmosphere through the cover 32 of steering wheel 30 via passageway 24. If there is sufficient leakage through cover 30 of steering wheel 30 and through the thermoplastic resin within cover 32 of steering wheel 30, passageway 24 and aperture 26 may be eliminated. To deflate bladder 12, valve 22 is manually opened by button 20, which is mounted on the back side of steering wheel 30 in a location that is accessible to the operator's index finger when grasping the steering wheel.

Figures 3B, 6:
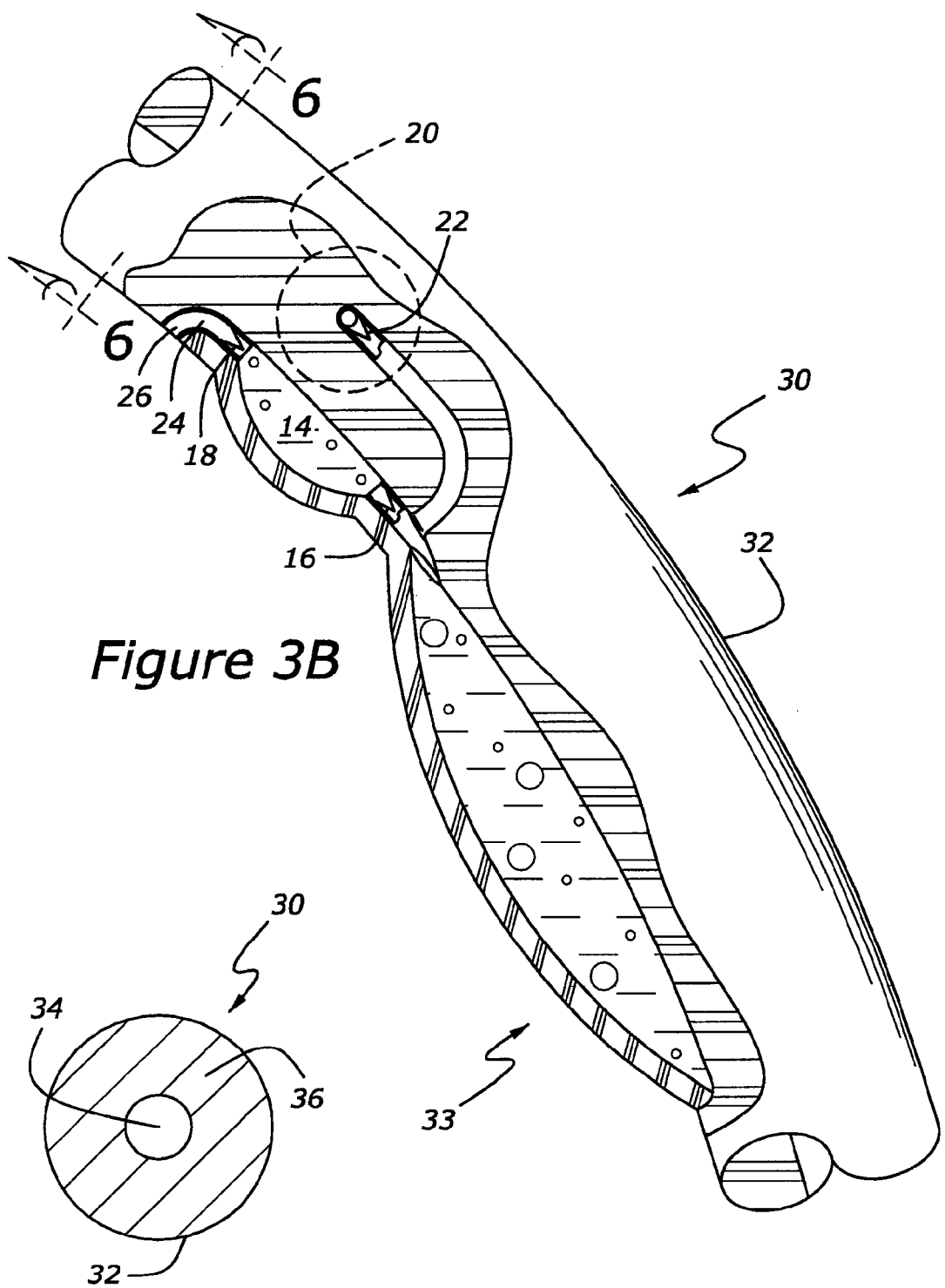
FIG. 3B is a view of the bladder system as installed in a steering wheel as seen from the driver's point of view when facing the steering wheel when the bladder is inflated.
FIG. 6 is a cross-section of a steering wheel at a position of the steering wheel not containing a bladder assembly.

Referring now to FIG. 3B, bladder 12 is shown fully pumped up. Bladder 12 bulges inwardly toward the hub or center of the steering wheel to form the inner portion of a palm swell. The term "palm swell" is hereby defined to mean a portion of the steering wheel rim (at a designed gripping location) having a generally oval-shaped cross-section, the long axis of the oval parallel with a radius extending outward from the hub of the steering wheel. When a vehicle operator grips the steering wheel 30 at the palm swell, the operator's fingers wrap around the outer surface of the rim, which remains rigid because the bladder 12 does not extend around the outside surface. This rigid outer portion of the palm swell allows the operator to maintain a firm grip on the steering wheel. The inflated inner portion of the palm swell supports the meaty part of the operator's palm adjacent the thumb for improved comfort. Because bladder 12 is located only on the inner or hub-facing surface of the rim, the rim does not expand radially outward or toward the operator when the bladder is inflated, and so the palm swell does not have a circular cross-section but rather is generally oval-shaped. The cross-sectional area of the rim of steering wheel 30 in the vicinity of bladder 12 is greater than with a deflated bladder as shown in FIG. 3A.

Figure 4:
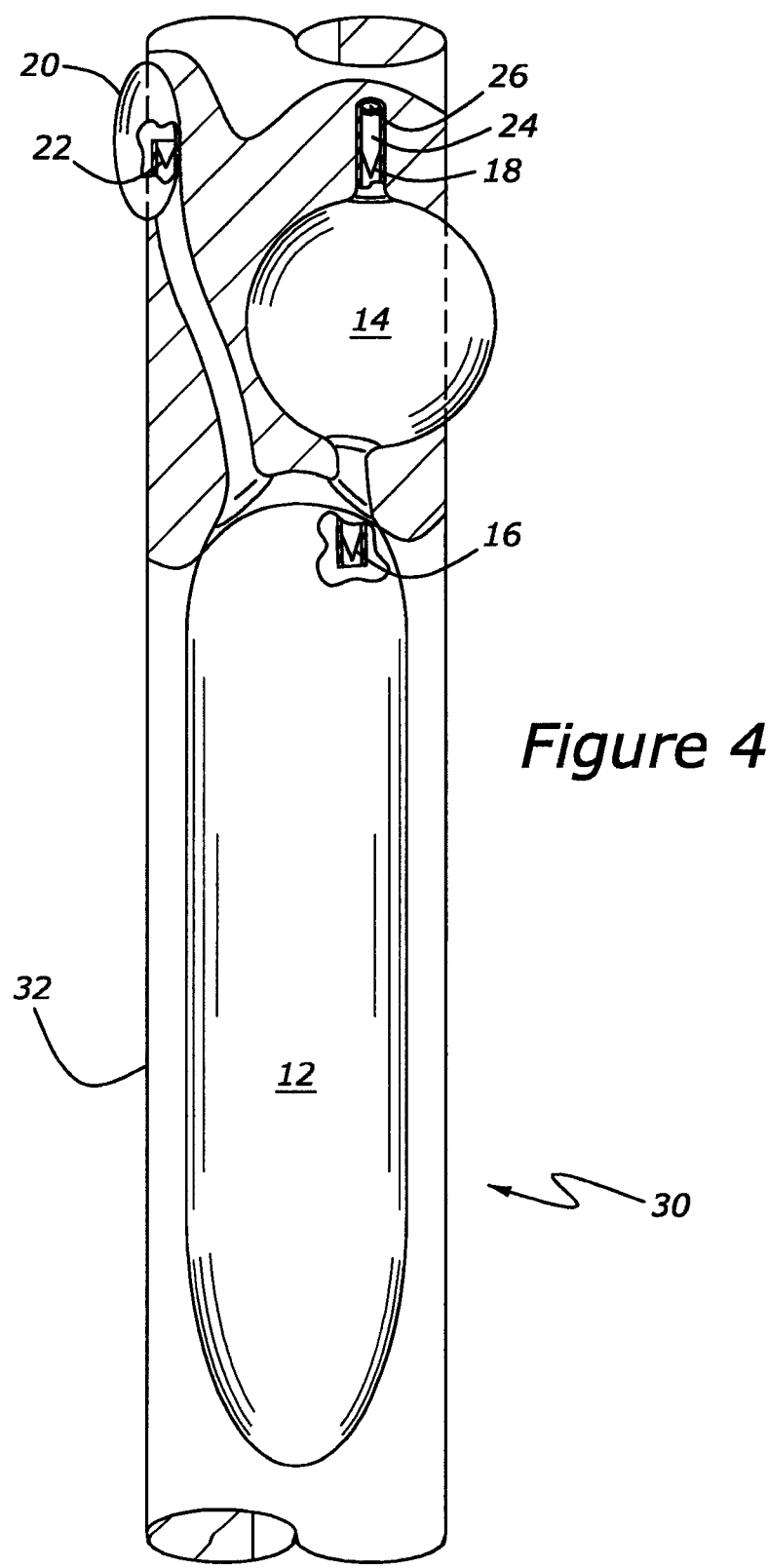
FIG. 4 is a view of the bladder system as installed in a steering wheel as viewed from the center of the steering wheel.

In FIG. 4, the bladder assembly is shown within steering wheel 30 from a view from central hub of the steering wheel looking out to the rim of the steering wheel, as indicated by arrow 33 in FIG. 3B. As seen in FIG. 4, bladder 12 covers only the portion of the rim surface that faces radially inward, toward the steering wheel hub. That is, the bladder does not extend around to the outward-facing surface of the rim. One is unable to determine whether bladder 12 is inflated or not from this angle. From this view, bulb 14 appears as a circle.

Figure 5A:
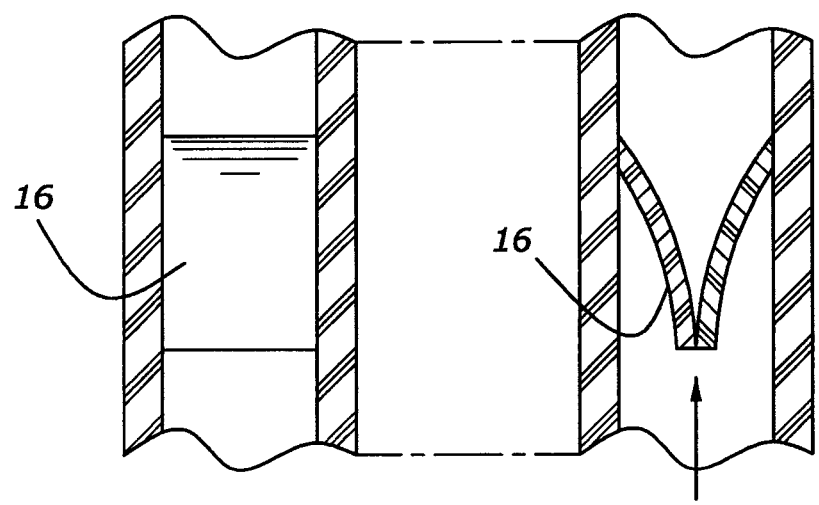
FIG. 5A is an illustration of a closed duckbill valve in two orientations.
Figure 5B:
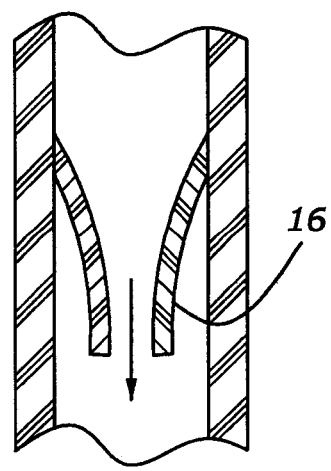
FIG. 5B is an illustration of an open duckbill valve.

In FIG. 5A, duckbill valve 16 is shown in a first orientation in the left illustration. In the right illustration, valve 16 is shown rotated by 90°. In leftmost view, the end of the valve appears rectangular. Valves 16, 18, and 22 are shown in all of FIGS. 3A, 3B, and 4 as being in the configuration at the right of FIG. 5A simply for illustration purposes. It should be understood that the actual orientation of the valves in any particular installation may vary, i.e. they may be oriented in a direction similar to that shown in the upper portion of FIG. 5A, in the lower portion of FIG. 5A, or some intermediate position not specifically illustrated. Furthermore, the valves in all of FIGS. 3A, 3B, 4, and 5A are shown closed. In FIG. 5B, an open duckbill valve is shown.

In FIG. 6, a cross-section of a steering wheel 30 is shown. A core 34 is made of a stiff material, such as steel, so that steering wheel 30 retains its shape. Core 34 is covered with a resilient thermoplastic resin 36, the core and resin thereby forming the rim of steering wheel 30. Thermoplastic resin 36 has a cover 32 over it. The illustration in FIG. 6 represents section 6-6 of FIG. 3B.

The bladder assembly 10 as shown in FIGS. 2, 3A, 3B, and 4 is a non-limiting embodiment of the present disclosure. There are many variations of that embodiment which are contemplated by the inventor of the present disclosure that will be apparent to those of ordinary skill in the art in light of the teachings of the present disclosure whether or not explicitly described or illustrated. For example, pump bulb 14 could be actuated by any digit of the hand, i.e., not limited to be the thumb. Similarly, the button 20 coupled to duckbill relief valve 22 could be actuated by any digit of the hand. The shape of bulb 14 is also non-limiting. Furthermore, any type of one-way valve can be used in place of duckbill valves 16 and 18. Relief valve 22 can be any valve that can be used for releasing the gases from bladder 12. The bladder assembly is shown in FIGS. 2, 3A, 3B, and 4 as having the inlet and outlet connections near the top of bladder 12. However, the inlet and outlet connections can be disposed at opposite ends of bladder 12, or any other alternative location on bladder 12.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

What is claimed:

1. A steering wheel, comprising:
    a circumferential rim;
    a flexible outer cover disposed over the rim; and
    an inflatable bladder disposed inside the outer cover and on only a radially inward facing surface of the rim, whereby upon inflation the bladder expands only radially inward to form a palm swell having a non-circular cross-section and comprising a rigid, non-inflated outward-facing portion and an inflated inward-facing portion.

2. The steering wheel of claim 1, wherein the bladder is 4 to 15 centimeters in length, with the longest dimension running along the circumference of the steering wheel.

3. The steering wheel of claim 1, further comprising:
    a bulb coupled to the bladder;
    a relief check valve coupled to the bladder;
    a first check valve disposed between the bulb and the bladder; and
    a second check valve disposed on an inlet side of the bulb.

4. The steering wheel of claim 3 wherein the first and second check valves are duckbill valves.

5. The steering wheel of claim 3 wherein the bulb and the relief valve are manually actuated.

6. The steering wheel of claim 3, wherein the bulb and the relief valve are adapted to be actuated by a human digit.

7. The steering wheel of claim 1 wherein the rim comprises a thermoplastic resin surrounding a core made from a high-strength material.

8. A steering wheel having a user-adjustable palm swell, comprising:
    a circumferential rim;
    an expandable outer covering surrounding the rim;
    a bladder disposed beneath the outer covering and only on a surface of the rim facing radially inward toward a hub of the steering wheel;
    an inlet tube coupled to the bladder;
    a bulb disposed in the inlet tube;
    a first check valve disposed in the inlet tube between the bulb and the bladder;
    a second check valve disposed in the inlet tube on the upstream side of the bulb;
    an outlet tube from the bladder to atmosphere; and
    a normally-closed relief valve disposed in the outlet tube.

9. The assembly of claim 8 wherein the first check valve is normally closed, the first check valve opening when pressure within the bulb exceeds pressure within the bladder, the second check valve is normally closed, the second check valve opening when atmospheric pressure exceeds the pressure within the bladder and atmospheric air is supplied to the bladder by manually depressing and releasing the bulb causing the first and second valves to open, respectively.

10. The assembly of claim 8 is mounted on the rim at a grip position.

11. The assembly of claim 10 wherein the bulb is located at a position accessible by a thumb of a hand gripping the steering wheel rim.

12. The assembly of claim 10 wherein the relief valve is located at a position accessible by a digit of a hand gripping the steering wheel rim.

13. A method for adjusting a gripping surface of a steering wheel in a vehicle, the method comprising:
    selectively filling and emptying a bladder positioned on only a portion of a rim of the steering wheel that faces a center of the steering wheel to selectively increase and decrease, respectively, the size of a palm swell having a non-circular cross-section, the resulting palm swell comprising a rigid, non-inflated outward-facing portion and an inflated inward-facing portion.

14. The method of claim 13 wherein selectively filling comprises manually pumping an inflator bulb coupled to the bladder.

15. The method of claim 14 wherein the inflator bulb is disposed beneath an elastic outer layer covering the steering wheel rim.

16. The method of claim 13 wherein selectively filling comprises selectively filling the bladder with air.

* * * * *